United States Patent
Staheli

(10) Patent No.: US 6,838,123 B2
(45) Date of Patent: Jan. 4, 2005

(54) METHOD OF COATING FIBER STRANDS WITH A PLASTIC COATING COMPOSITION FROM INDIVIDUAL COATING CONSTITUENTS

(75) Inventor: Theo Staheli, Reinach (CH)

(73) Assignee: Neopreg AG (CH)

( * ) Notice: Subject to any disclaimer, the term of this patent is extended or adjusted under 35 U.S.C. 154(b) by 0 days.

(21) Appl. No.: 10/187,151

(22) Filed: Jul. 1, 2002

(65) Prior Publication Data

US 2002/0197397 A1 Dec. 26, 2002

Related U.S. Application Data

(63) Continuation of application No. 09/600,275, filed on Nov. 27, 2000, now abandoned.

(30) Foreign Application Priority Data

Jan. 16, 1998 (CH) .................................................. 91/98
Jan. 15, 1999 (CH) ................................. PCT/CH99/1999

(51) Int. Cl.⁷ .............................. B05D 1/04; B05D 1/22
(52) U.S. Cl. ....................... 427/459; 427/461; 427/174; 427/185
(58) Field of Search ................................ 427/459, 461, 427/185, 174–176; 118/634, DIG. 5; 428/361, 375, 377, 378, 383

(56) References Cited

U.S. PATENT DOCUMENTS 3,742,106 A * 6/1973 Price
5,296,265 A * 3/1994 Okuma et al. ............... 427/213
5,302,419 A * 4/1994 Muzzy ........................ 427/485
5,605,757 A * 2/1997 Klett

FOREIGN PATENT DOCUMENTS

| DE | 46793 | | 6/1966 |
| EP | 680 813 | * | 5/1994 |
| EP | 0 680 813 A1 | | 5/1994 |
| EP | 0 599 404 B1 | | 2/1997 |
| GB | 1 376 137 | | 12/1974 |
| JP | 6-106530 | * | 4/1994 |
| WO | 97/37776 | * | 10/1997 |

OTHER PUBLICATIONS

Derwent Accession No. XP–002099323, English language abstract of JP 94–163474.
Derwent English language abstract EP 0 680 813 A1 (document above).
Derwent English language abstract DD 46793 (document above).

* cited by examiner

Primary Examiner—Fred J. Parker
(74) Attorney, Agent, or Firm—Hoffmann & Baron, LLP

(57) ABSTRACT

The invention relates to a method for coating fibers shaped as fiber strands (roving and mats) using a fluidized bed technique, wherein (i) the desired composition of the individual coating constituents is directly applied from the fluidized bed without previous compounding and (ii) the individual coating constituents contained in the fluidized bed are additionally mixed in the mass so that dissociation of individual constituents is substantially avoided. The invention also relates to a device for implementing the method.

16 Claims, No Drawings

METHOD OF COATING FIBER STRANDS WITH A PLASTIC COATING COMPOSITION FROM INDIVIDUAL COATING CONSTITUENTS

This Application is a continuation of U.S. application Ser. No. 09/600,275 filed on Nov. 27, 2000, abandoned.

BACKGROUND OF THE INVENTION

1. Field of the Invention

The present invention relates to a method of coating fibres which can be used for the production of tapes and prepregs, fibre-reinforced plastic granules and fibre-reinforced mouldings. The aim of the invention is to simplify and improve the coating of fibres by the dry coating method.

2. Background of the Related Technology

The production of plastic-coated fibres, for example in the form of strands (rovings, mats and/or woven fabrics), tapes, prepregs or fibre-reinforced plastic granules, is known per se. The conventional procedure is to coat fibres with a plastic, possibly containing various additives, and process them to granules. Such granules are often rod-shaped. They are then processed to fibre-reinforced mouldings by methods known per se, for example by compression.

Fibre-reinforced plastic granules can be produced with chopped glass fibres, for example by a compounding method known per se. In this procedure the fibres are shortened by the high shear stress to a residual length of less than 1 mm. Compared with granules reinforced with long fibres, the mouldings from granules produced by the compounding method normally have low strength values.

Another known method is hot-melt coating for the production of thermoplastics reinforced with long fibres. In this wet impregnation method the fibre strands to be coated are prepared in the form of rovings or braids (mats and/or woven fabric). These are passed through a melt containing thermoplastics or thermosets, left to cool and then optionally granulated. However, in the practical application of this method, especially when the proportion of fibres is high and their length increases, the strength values are found to have a high scatter and the moulding exhibits numerous localized weaknesses.

In another known method the fibre strands to be coated are drawn through a liquid impregnating bath containing the plastic, for example a resin, dissolved in a solvent, the appropriate curing agent and an accelerator, together with additives. After the fibres have been drawn through this impregnating bath, the solvent is removed from the coating by evaporation. The strand is then granulated. This method has the disadvantage of using a solvent. Furthermore, the production rate of the coated fibre braids is comparatively low because the solvent has to be evaporated off and removed. If the coating operation is carried out with a reaction resin, for example an epoxy resin, the coated fibre is not stable on storage at room temperature.

In another known method of producing granules reinforced with long fibres, the fibre strands to be coated are moved by a dry method through a fluidized bed consisting of a powdered plastic already incorporating all the additives, this powder attaching itself to the fibres in the form of a coating. The now coated fibres are then heated and the plastic attached to the fibre is liquefied. The coated fibres are cooled and then granulated. If a reaction resin mixture is used, the coated material obtained is precrosslinked in the heating process. These granules are then processed to fibre-reinforced mouldings, preferably by compression. The coated fibres and granules obtained by this method using reaction resins, for example epoxy resins, have the disadvantage that they are not stable on storage at room temperature and that the flow properties of such products constantly change. The low latency of such moulding compounds constitutes a further problem by setting narrow limits on the productivity of the compounding method and considerably restricting the possibility of reactive adjustment of the moulding compounds for coating.

DETAILED DESCRIPTION OF THE INVENTION

It has now been found, surprisingly, that the desired composition of the individual coating constituents can be uniformly applied directly to the fibre by a dry method, for example using a fluidized bed technique, without previous compounding, if the individual coating constituents contained in the fluidized bed are additionally mixed in the mass in the fluidized bed so that dissociation of the individual constituents is substantially avoided or eliminated. Surprisingly, this method yields products which are stable on storage and have very good storage stabilities at temperatures of 30° C. This method also allows very reactive adjustment of the moulding compounds and hence latent curing in very short processing cycles.

According to the present invention, the additional mixing promotes the uniform penetration of the powder particles between and onto the fibre filaments and the fluidization of powders of unfavourable particle size distribution, reduces the loss of powder after coating in the continuous oven and improves the maintenance and control of an exact fibre content. The production method dispenses with the compounding, grinding and sizing of the individual coating constituents, affording appreciable advantages in both technical and economic terms. Fibres or fibre strands coated in this way can be used for example to produce tapes, prepregs, granules and/or mouldings.

The present invention relates to a dry method of coating fibres, preferably in the form of strands (rovings, mats and/or woven fabric), preferably using a fluidized bed technique, which is characterized in that (i) the desired composition of the individual coating constituents is directly applied to the fibres from the fluidized bed without previous compounding and (ii) the individual coating constituents contained in the fluidized bed are additionally mixed in the mass during coating so that dissociation of the individual constituents is substantially avoided.

The mixing or thorough mixing of the coating constituents in the fluidized bed can be carried out mechanically, for example with a rotor or stirrer, with ultrasound, with suitable electromagnetic waves or by other methods known per se. It is preferred to use a mechanical mixing method or ultrasound, especially mechanical mixing. Particularly good results are obtained if the individual coating constituents are not only thoroughly mixed but also electrostatically charged in the fluidized bed.

The present invention further relates to the fibre strands (rovings, mats and/or woven fabric) coated with plastic by the method of the invention.

The present invention further relates to the use of the fibre strands (rovings, mats and/or woven fabric) coated with plastic by the method of the invention for the production of tapes, prepregs, fibre-reinforced plastic granules and/or mouldings, particularly tapes, prepregs, plastic granules and/or mouldings reinforced with long fibres, and especially plastic granules reinforced with long fibres or fibre-reinforced mouldings. Tapes also include continuously produced fibre-reinforced tapes and their production. Prepregs include unidirectional and woven fabric-reinforced prepregs and their production.

The present invention further relates to a method of producing tapes, prepregs, plastic granules and/or fibre-reinforced mouldings, especially plastic granules reinforced with long fibres, which is characterized in that the coated fibre strands used for their production have been coated with a plastic by the method of the present invention.

According to the invention, the fibres used can be any fibres known per se for the production of fibre-reinforced materials, for example synthetic inorganic fibres, especially glass fibres or carbon fibres, plastic fibres, especially aramide fibres (aromatic polyamide), or natural fibres, especially cellulose fibres. The filaments preferably have a thickness of about 5 $\mu$m to 20 $\mu$m and a weight of about 100 tex–4800 tex (0.1 g/m–4.8 g/m), preferably 600 tex–1200 tex, such as those in conventional use.

The particle size distribution of the coating constituents is preferably in the range 30 $\mu$m–250 $\mu$m and particularly preferably in the range 50 $\mu$m–250 $\mu$m. The mean particle size is preferably about 50 $\mu$m–150 $\mu$m.

According to the invention, the plastics used can be the thermoplastic and thermosetting moulding compounds known per se. A large number of thermoplastic moulding compounds or thermoplastics and their additives are known from the literature. Examples of thermosets in the form of polycondensates are curable phenol/formaldehyde plastics (PF cast resins), curable bisphenol resins, curable urea/formaldehyde plastics (UF moulding compounds), polyimides (PI), BMI moulding compounds and polybenzimidazoles (PBI). Examples of thermosets in the form of polyadducts are epoxy resins (EP), moulding compounds from unsaturated polyester resins (UP moulding compounds), DAP resins (polydiallyl phthalate), MF moulding compounds, e.g. curable melamine/phenol/formaldehyde moulding compounds, or crosslinked polyurethanes (PUR).

Apart from the resin/curing agent/accelerator system for thermosets, examples of additives for thermoplastic moulding compounds or thermoplastics and for thermosets in the form of polycondensates or polyadducts are release agents, lubricants, fillers, pigments, primers, stabilizers and inhibitors. Such compounds are known per se, as are also the preferred compositions to be used for the coatings according to the present invention.

For the thorough mechanical mixing of the coating constituents in the fluidized bed, the fanned out fibre strands (rovings, mats and/or woven fabric) are preferably fed parallel between the fluid bottom and one or more rotors rotating horizontally at a speed which assures the thorough mechanical mixing of the coating constituents. The rotor avoids any kind of cratering, so it is also possible according to the invention to use powders which cannot be fluidized under conventional conditions. Due to the friction produced between the polymer powder and the rotor blade or blades, the powder particles are additionally charged electrostatically, making them adhere better to the filaments as they pass through the oven. This electrostatic charge can amount to 1000 to 2000 volts.

The temperature of the air entering the fluidization pan, i.e. the conditioning of the fluidizing air, is controlled proportionally to the melting point of the polymer powder, making it possible to control the amount of powder applied.

It is preferred to use a fluid bottom consisting of sintered aluminum. The conditioning of the fluidizing air makes it possible to preheat high-melting thermoplastic powders to below the softening point during the actual coating process, thereby reducing the required heating time. The productivity can thus be considerably increased when using high-melting thermoplastics. However, in the case of reaction resin mixtures, the heating due to conditioning is only allowed to bring the temperature to sufficiently below the level (onset temperature) at which the exothermic curing process of these resin mixtures begins.

In the coating method itself, the fibre strands (rovings, mats and/or woven fabric) are unwound from a roving frame, preferably also fanned out, and passed through the sintering bath. This mainly comprises a trough and includes the inlet for the coating constituents as well as the fluid bottom, which preferably consists of sintered aluminum and through which the air entering the fluidization pan, i.e. the fluidizing air for maintaining the fluidized bed, is introduced. In this system the diameter of the perforations in the perforated false bottom (fluid bottom) is smaller than the particle size of the coating powder used or of the coating constituents or the granules. Air or an inert gas is blown through the perforations from underneath to create a seething powder or granule bath or a fluidized bed. The sintering bath also comprises several deflection rollers or bars for fanning out and taunting the fibres and, according to the invention, a mixing device for the thorough mixing of the coating constituents. It is preferred to use rotating deflection rollers in the region where the fibres are already coated, and non-rotating deflection bars in the feed zone, where the fibres are not yet coated. The mixing device can consist of one rotor or stirrer or several rotors or stirrers which thoroughly mix the coating constituents. The rotor can be e.g. a perforated disk possessing several perforations (holes) with diameters of between 1 and 10 cm and rotating horizontally about its centre, or it can be a steel stirrer or a simple rod supported vertically at its centre and rotating at high speed. The rotors or stirrers are preferably installed close to the fibre strands so that the mechanical forces exerted on the coating constituents additionally improve the penetration of the powder particles inside the fanned out fibre strands. The rotor is preferably installed directly, i.e. about 3 mm to 10 mm, above the fluid bottom so that the powder to be fluidized is already stirred prior to fluidization and any bridges forming in the powder to be fluidized are thus immediately destroyed. Depending on the design, the speed of rotation of said stirrer is about 100 rotations per minute (rpm) to about 400 rpm, preferably about 200 rpm to about 300 rpm. However, the speed of rotation depends on the particular design features and process conditions and always has to be optimized for each process, which presents no problems to those skilled in the art.

After leaving the sintering bath, the coated fibre strands are heated. This is preferably done by bundling them up again and passing them through an infrared heater, where the coating is fixed by brief heating. This makes the coating free-flowing or pasty but not so fluid that it can drip off the fibres. In this state, further coating powder or granules can then be applied immediately in an aftercoating operation, preferably in another coating device of an analogous design to that described above, i.e. preferably also using a fluidized bed technique, and then dried in the infrared oven. It is thus possible to supplement the amount of plastic which it is desired to apply to the fibres. The filament weights obtained with the first coating can be doubled by this procedure and filaments with a very low glass content by weight can be obtained. Thus, for example, it is possible to obtain filaments with a glass fibre content of only 15% by weight. Likewise the mineral content of the coating can be significantly increased by means of an aftercoating operation, whereby the sintering bath and the coating device can be coupled together in terms of pressure, both devices preferably being operated under a slight negative pressure.

After the fibre strands have passed through the coating device, the now coated fibre strands are led through a conditioning section consisting of a cooling device and optionally a heating device. If the coating applied was an epoxy resin mixture, the fibre strands are heated again, the epoxy resin mixture being pregelled or precrosslinked but not cured. Here the coated and fanned out fibres can optionally be brought together again and cooled in a downstream cooling device. The cooling is also necessary mainly because the fibre/plastic composite is then drawn through a pair of rollers for conveying this composite. The fibre/plastic composite must be in a solid state when it reaches the pair of rollers; otherwise the plastic may stick to said rollers, thereby soiling them and possibly preventing the fibre/plastic composite from being conveyed reliably. Preferably the fibre/plastic composite passes through another heating device, where any stresses existing in the composite are relieved. The coated fibre strand obtained can then be wound up or granulated.

In these terms the present invention relates to a method of coating fibres which is characterized in that (i) the coating operation is carried out in a sintering bath comprising a trough, an inlet for the coating constituents, a fluid bottom, several deflection bars for fanning out and taunting the fibres, and a mixing device for thorough mixing of the coating constituents, then (ii) the coating is fixed by brief heating in an infrared heater, optionally (iii) further coating powder or granules are then applied immediately, preferably in another coating device also using a fluidized bed technique, and then (iv) the now coated fibre strands are led through a conditioning section consisting of a cooling device and optionally a heating device, and finally the cooled coated fibres are optionally wound up or granulated.

The coating of fibre strands (rovings, mats and/or woven fabric) with a reaction resin (e.g. epoxy resin) by the method of the invention is carried out using a melting temperature in the range 60° C.–400° C., preferably 70° C.–220° C., a roller temperature of 10° C.–200° C., preferably 20° C.–50° C., and a filament speed of 3–200 m/minute, preferably 80–150 m/minute. The processing conditions for the various fibre-reinforced plastics and plastic granules are known per se and it is easy for those skilled in the art to apply the correct conditions to the particular resin used.

The present invention further relates to a device for implementing the method according to the invention, said device comprising the following components: (i) for coating the fibre strands, a sintering bath comprising a trough, an inlet for the coating constituents, a fluid bottom, several deflection bars for fanning out and taunting the fibres, and a mixing device for thorough mixing of the coating constituents, (ii) for fixing the coating, an infrared heater downstream of said bath, (iii) optionally another coating device downstream of said heater, and (iv) for further treatment and cooling of the coated fibre strands, a conditioning section consisting of a cooling device and optionally a heating device.

The Examples which follow illustrate the invention.

EXAMPLE 1

Glass rovings containing 900 filaments with diameters of 0.005 mm, 0.01 mm and 0.018 mm (5 µm, 10 µm and 18 µm) are coated with a matrix containing a conventional bisphenol resin and curing agent (85% of the total coating) together with conventional release agents, lubricants, fillers (14.5%) and pigments in a standard composition. The constituents of the matrix are mixed in a mixer and have a particle size distribution in the range 30 µm to 200 µm. The coating method is carried out in an apparatus such as that described in EP-A-0 680 813 with the difference that a metal rotor rod, which rotates at 200 rpm and thoroughly mixes the coating mixture over the whole area, is installed directly, i.e. 5 mm, above the fluid bottom. The intimate thorough mixing also charges the mixture electrostatically. The glass rovings are wound off from the inside or outside of a roving frame, fanned out and led through the sintering bath at a speed of 100 m/minute via four deflection bars. The coating on the rovings is then melted in a continuous infrared oven at a temperature of 180° C. The glass rovings impregnated with the molten plastic are then coated again using a fluidized bed technique. The coated rovings are subsequently cooled to resolidify the plastic, and then granulated. The granules obtained in this way are then processed by compression to standard bars as defined by ISO standard 178 and tested for their mechanical properties, giving excellent values for the flexural strengths and moduli of elasticity.

EXAMPLE 2

Glass rovings according to Example 1 are coated with a matrix by a procedure analogous to that described in Example 1. After the first pass through the continuous infrared oven, they are aftercoated with a composition consisting of a conventional epoxy resin (47.4% of resin and 12.2% of curing agent), a conventional accelerator (0.2%), a filler (38% of aluminum hydroxide) and 2.2% of other ingredients conventionally used per se (release agents, lubricants and pigments). The coated rovings are passed through a continuous infrared oven again, subsequently cooled to resolidify the plastic, and then granulated. The granules obtained in this way have an epoxy content of 30.8%, a filler content of 25.5% and a glass fibre content of 42.4%. Analogously to Example 1, the granules are then processed to standard bars as defined by ISO standard 178 and tested for their mechanical properties, giving excellent values.

What is claimed is:

1. A method of uniformly coating strands comprising fibres, with a reactive plastics coating composition, comprising the step of applying individual coating constituents directly onto the fibers using a fluidized bed, wherein:

(a) said reactive plastics coating composition is a thermosetting molding composition in the form of a resin/curing agent/accelerator system, wherein said resin, said curing agent and said accelerator components are included as individual coating constituents; and (b) said individual coating constituents are mixed within said fluidized bed during coating with a mixing means selected from the group consisting of mechanical means, ultrasound and electromagnetic waves.

2. The method of claim 1, wherein said strands comprise a material selected from the group consisting of synthetic inorganic fibres, plastic fibres and natural fibres.

3. The method of claim 2, wherein said strands comprise a member selected from the group consisting of glass fibres, carbon fibres, aramide fibres, and cellulose fibres.

4. The method of claim 1, wherein said fibres comprise filaments having a thickness from about 5 µm to about 20 µm and a weight of about 100 tex to about 4800 tex.

5. The method of claim 1, wherein a particle size distribution of said coating constituents comprises a range of about 30 µm to about 250 µm.

6. The method of claim 1, wherein a particle size distribution of said coating constituents comprises a range of about 50 µm to about 250 µm.

7. The method of claim 1, wherein said individual coating constituents are charged electrostatically in said fluidized bed.

8. The method of claim 1, further comprising the step of adding at least one additional coating of said plastics coating composition to said fibre strands by (a) conducting an aftercoating operation using said fluidized bed and (b) drying said fibre strands in a continuous infrared oven.

9. The method of claim 1, wherein (i) said coating step is carried out in a sintering bath comprising a trough, an inlet for said coating constituents, a fluid bottom, deflection bars for fanning out and tauteing said fibres, and a mixing device for thorough mixing of said coating constituents, wherein (ii) after leaving said sintering bath, said coating is fixed by heating in an infrared heater; and optionally (iii) applying a second coating to said fibres using a second fluidized bed (iv) leading said fibres through a continuous infrared oven or a conditioning section consisting of a cooling device and optionally a heating device, and (v) cooling said fibres, which are optionally wound up or granulated.

10. The method of claim 1, wherein said mixing means is a mechanical means comprising one or more rotors or one or more stirrers, said one or more rotors or said one or more stirrers being supported vertically at a center of each of said rotors or said stirrers and rotating horizontally about said center.

11. The method of claim 10, wherein said one or more rotors is a perforated disk rotating horizontally about a center of said rotor.

12. The method of claim 1, wherein said thermosetting molding composition further comprises an inorganic filler material, and optionally comprises further additives.

13. The method of claim 12, wherein said inorganic filler material is present in a concentration of at least 14.5% by weight of said thermosetting coating composition.

14. The method of claim 12, wherein said individual coating constituents comprise an additive selected from the group consisting of lubricants, fillers, pigments, primers, stabilizers and inhibitors.

15. The method of claim 12, wherein said filler material comprises a member selected from the group consisting of silicon oxide, aluminum oxide, titanium oxide and dolomite.

16. The method of claim 12, wherein said filler material comprises aluminum hydroxide.

* * * * *